(No Model.)
W. J. FRYER, Jr.
Joint for Cement Illuminating Tiles for Roofs and Pavements.
No. 239,607. Patented April 5, 1881.
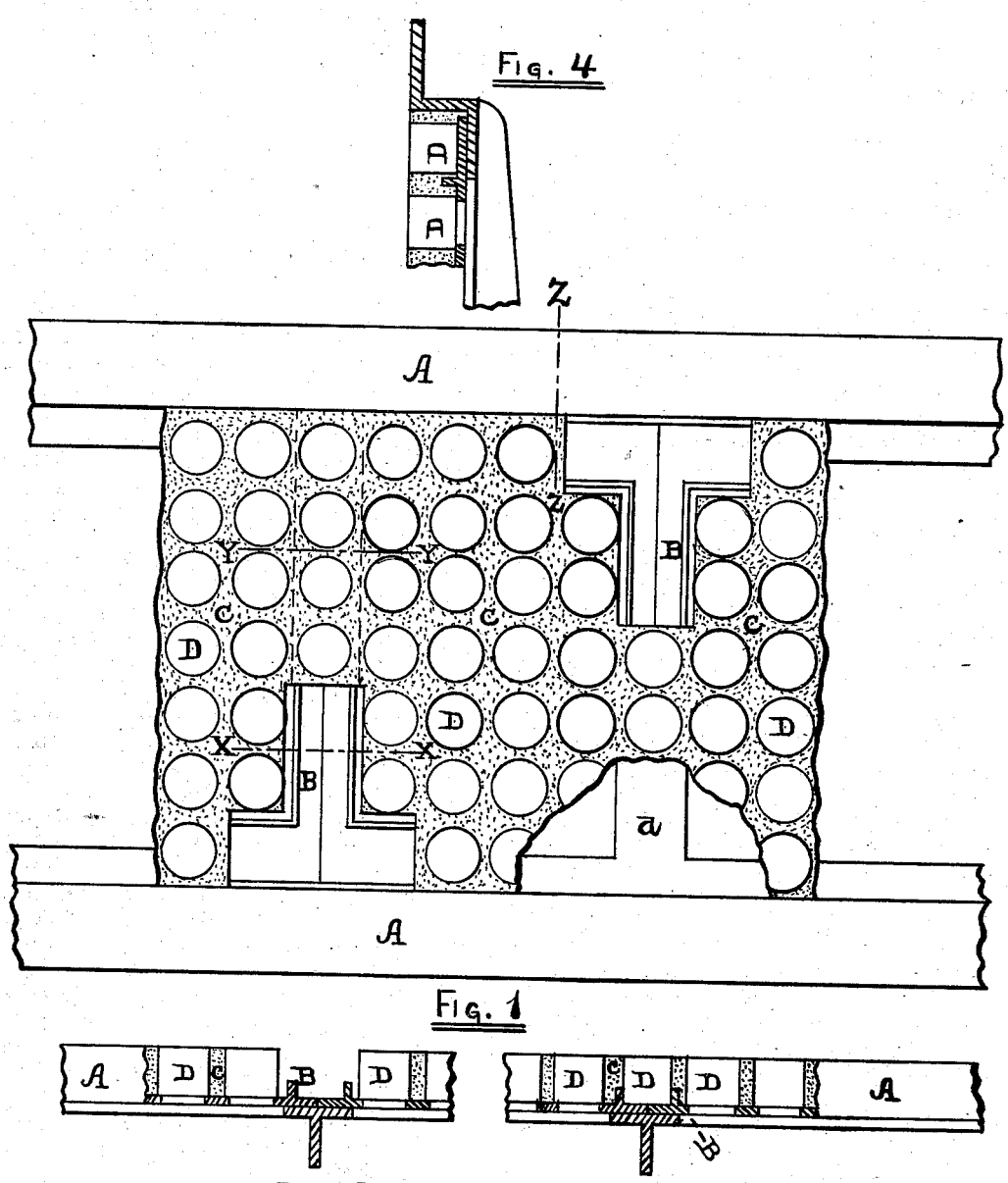
WITNESSES:
L. M. Bolles.
Arthur Laurence.
INVENTOR:
Wm J. Fryer, Jr.

UNITED STATES PATENT OFFICE.

WILLIAM J. FRYER, JR., OF NEW YORK, N. Y.

JOINT FOR CEMENT ILLUMINATING-TILES FOR ROOFS AND PAVEMENTS.

SPECIFICATION forming part of Letters Patent No. 239,607, dated April 5, 1881.

Application filed March 2, 1881. (No model).

*To all whom it may concern:*

Be it known that I, WILLIAM J. FRYER, Jr., iron-founder, of No. 104 Goerck street, in the city of New York, county and State of New York, have invented a new and useful Improvement in Joints for Cement Illuminating-Tiles for Roofs and Pavements, of which the following is a specification, reference being had to the accompanying drawings, in which—

Figure 1 is a plan of a platform of cement illuminating-tiles. Fig. 2 is a section at X X. Fig. 3 is a section at Y Y, and Fig. 4 is a section at Z Z.

A is the usual cast-iron frame with cross-bearers *a*. B is the iron dish or grating of the tile. C is the cement. D D are the glass lenses.

Similar letters of reference indicate corresponding parts.

My invention is an improvement upon the joint for cement illuminating-tiles patented to me August 10, 1880, No. 230,931, in which I make the border of my dish or grating considerably lower than the upper surface of the glass and cement filling, and keeping the Portland cement or other plastic material back from the border any desirable distance, so that when the tiles are bolted down in their frames the small space between the tiles where they meet over the bearers and the greater space between the cement-filling is filled in with plastic cement. The result is a perfectly water-tight joint, and a blind one; but by reference to the drawings of my patent of August 10, 1880, it will be seen that the places where the bearers *a* occur are clearly defined on the upper surface of the tile platform by reason of the greater space or width of cement that occurs between the rows of glasses where the tiles meet over the bearers.

By reference to the drawings, making part of the present specification, it will be seen that I keep the border of my disk or grating of the same slight depth, as previously described, only I keep this border farther into the tile— that is, farther away from the meeting or outer edges of the tile—and by this means, when I perform the last act of laying the work, by pouring in plastic cement to connect the cement of one tile with the cement of the adjoining tile, I also lay in a row of glass lenses. By thus adding a row of glasses to the cement filling over the line of bearers *a* to the eye above there is no possible chance of discerning the position of the bearers. Of course no light is transmitted through these last-described glasses. From above only is the addition of any consequence, and then only for appearance' sake, making a congregation of tiles to appear like one enormous big tile complete and perfect to the eye. It will be noticed that these glasses could not be laid in with the cement over the bearers and the effect obtained without making the border low, as described in my previous patent, and without leaving a space to be filled in within each tile, as patented to me in the patent hereinbefore referred to. Therefore, as an improvement on my patent No. 230,931, dated August 10, 1880,

What I claim as my invention is—

A blind and water-tight joint for cement illuminating-tiles, in which the border of the disk or grating is not only kept lower than the upper surface of the glass and cement-filling, but is set a sufficient distance away from the meeting edges around the periphery of the tile to permit glass lenses to be set in the spaces thus provided when the plastic cement is poured in to fill up the joint and connect the cement of one tile with the cement of an adjoining tile, substantially as and for the purpose specified.

In testimony that I claim the foregoing I have hereunto set my hand this 28th day of February, 1881.

WM. J. FRYER, JR.

Witnesses:
L. M. BOLLES,
ARTHUR LAURENCE.